United States Patent Office 2,912,633
Patented Nov. 10, 1959

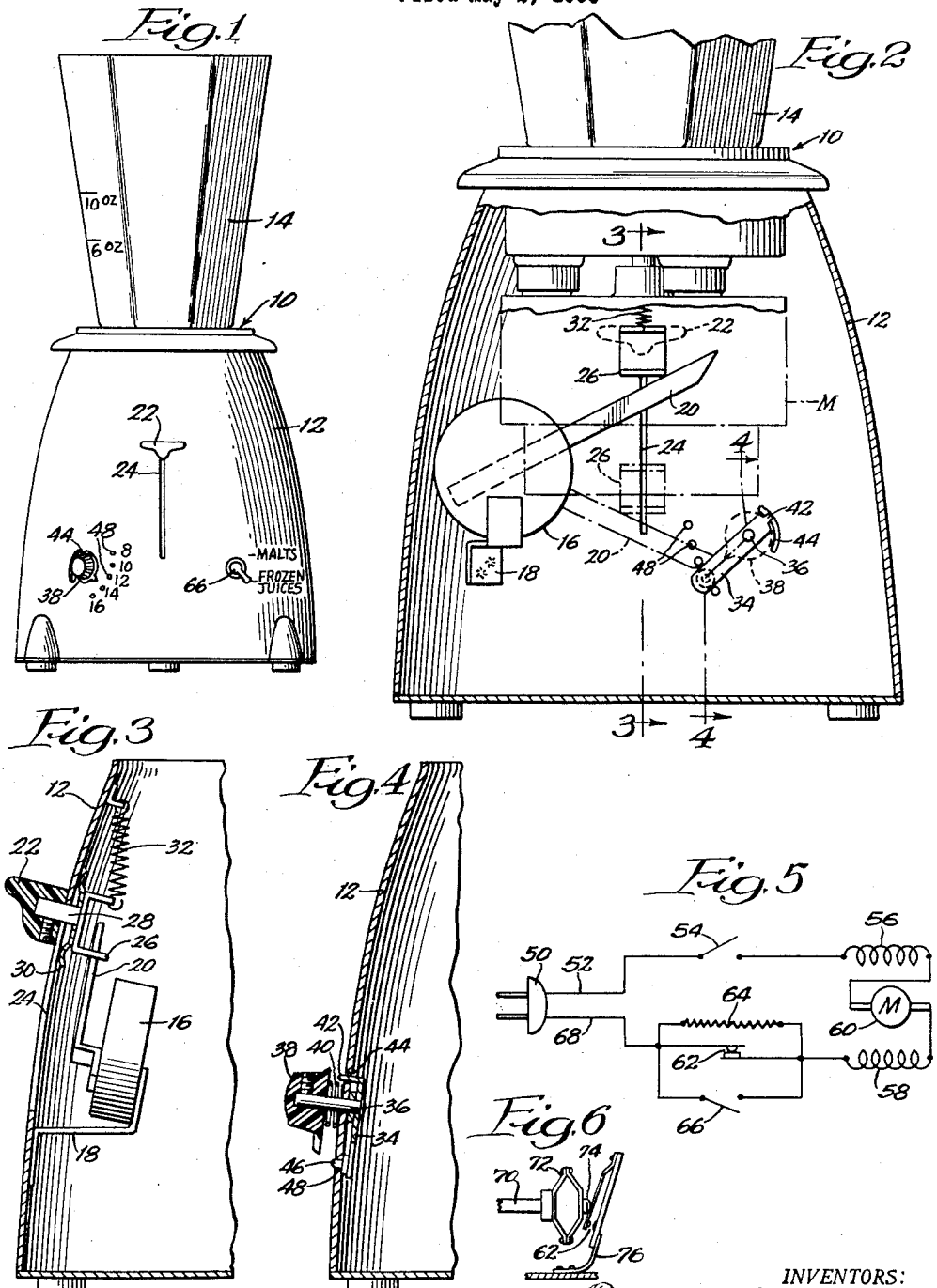

2,912,633

TIME AND SPEED CONTROL FOR MIXING DEVICE

Richard B. Nebinger and Israel Pass, St. Louis, Mo., assignors to Knapp-Monarch Company, St. Louis, Mo., a corporation of Delaware Application May 2, 1955, Serial No. 505,475

1 Claim. (Cl. 318—268)

The present invention relates generally to a mixer for liquids and semi-liquids of the type known as a liquidizer, and more particularly to novel control means for predetermining the time and regulating the speed of a cycle of mixer operation.

The widespread use of frozen foods, and particularly frozen fruit juice concentrates, has resulted in the need for an electrical appliance capable of reconstituting frozen liquid and semi-liquid foods in a manner which will provide a palatable drink closely simulating a natural or freshly prepared beverage. One of the most important problems in reconstituting frozen fruit juices and the like, is the regulation of the time of the mixing cycle so as to provide a reconstituted liquid having a minimum amount of foam and resembling as nearly as possible the freshly squeezed fruit juices. Because of variations in the temperature of the refrigerated frozen concentrate, it is necessary to provide a mixing cycle which may be variably regulated in duration in accordance with the predetermined mixing requirements of the frozen concentrate. For example, when the concentrate is kept at a relatively high refrigeration temperature, a shorter period of mixing time is required than is necessary for the same concentrate when kept at a comparatively low temperature. In the former case, the concentrate is relatively "soft" and is more readily reconstituted, whereas in the latter case the concentrate is relatively "hard" and requires a longer period of mixing. Over-mixing, of course, results in the undesirable incorporation of excessive foam in the beverage. It is necessary, therefore, to provide variable means for determining the requisite timing cycle of mixer operation for producing a palatable drink.

It is the primary object of the present invention to provide a liquidizer construction having a novel lever arrangement adapted to be manually set for limiting the extent of travel of a motor-energizing timing device, whereby the time of mixing operation may be regulatably predetermined.

It is another object to provide a liquidizer having an electrical control circuit including shuntable governor means for enabling selective varying of the speed of mixer drive at full torque to permit both normal mixing and reconstituting operation with full motor power.

Further objects and advantages of this invention will become apparent as the following description proceeds and the features of novelty which characterize this invention will be pointed out with particularity in the claim annexed to and forming part of this specification.

A preferred embodiment of the invention is shown in the accompanying drawing, in which:

Figure 1 is a side elevational view of a liquidizer appliance constructed in accordance with the present invention;

Figure 2 is a fragmentary sectional view of the liquidizer of Figure 1 on an enlarged scale, showing details of internal construction;

Figures 3 and 4 are fragmentary sectional views taken substantially as indicated by the lines 3—3 and 4—4, respectively, on Figure 2;

Figure 5 is an electrical circuit diagram illustrating the manner of control operation; and Figure 6 is a diagrammatic view of the motor speed control switch contacts and cooperating governor device.

Referring now more particularly to the drawing, we have indicated generally at 10 a liquidizer embodying the features of the present invention. The liquidizer 10 comprises a base housing 12 enclosing the power unit of the liquidizer and providing means for supporting the unit on a level surface. A mixer bowl 14 is adapted to be operatively attached to the upper end of the base 12.

As best seen in Figure 2, the base housing 12 serves to mountingly support an electrical motor M therein for driving suitable mixing blades within the bowl 14, in conventional manner. A mechanical clock timer 16 is fixedly supported within the housing 12 by means of a mounting bracket 18. The timer 16 is of the well-known type which provides automatic clock works capable of being wound by rotation of an actuator element in one direction, and which thereafter automatically unwinds at a predetermined time rate. The greater the extent of timer winding, the longer the period necessary to complete automatic unwinding.

An elongated lever arm 20 extends from the timer 16, and is operatively connected to the clock works to effect winding thereof when rotated in a downward or clockwise direction as seen in Figure 2, and to be automatically rotated in an upward or counter-clockwise direction by the timer during unwinding of the clock works.

An actuator control knob 22 is positioned externally of the housing 12. A vertical slot 24 in the housing 12 is provided for vertical sliding movement of the knob 22. A contact bracket 26 is positioned internally of the housing 12 and fixedly secured to the knob 22 by means of a connector rod 28. A slide spring 30 is provided for frictional engagement with the inner wall of the housing 12, and a tension spring 32 is anchored to the bracket 26 and to the housing 12 thereabove. In this way, downward sliding movement of the knob 22, and the bracket 26 carried thereby, will be opposed by the tension spring 32. When the knob 22 is released at the lower end of the slot 24, the spring 32 will cause the knob 22 to return to its initial position at the upper end of the slot 24. The slide spring 30 provides guiding restraint to effect smoothly sliding movement of the knob 22 during vertical movements.

The bracket 26 contactingly engages the free outer end of the lever arm 20 when in its upper or rest position. It will be apparent that as the control knob 22 is manually slid downwardly, the arm 20 will be moved downwardly and thus rotated by bracket 26 to effect winding of the clock works of timer 16. Such a lower or wound position of the lever arm 20 and actuator knob 22 are shown in dot and dash lines in Figure 2.

When released, the knob 22 will return to its upper position, and the clock timer 16 will automatically commence unwinding operation, thereby effecting gradual rotation of the arm 20 in an upward or counter-clockwise direction toward its upper or rest position.

In order to predetermine the lowermost position of the arm 20 after lowering rotation by downward sliding movement of the control knob 22 and bracket 26, we provide a rotatable arm 34 mounted within the housing 12 on a pivot shaft 36 which extends outwardly through the housing wall. The shaft 36 carries a timer setting knob 38 externally of the housing 12. A compression spring 40 is interposed between the knob 38 and the outer wall surface of the housing 12 to urge the knob 38 outwardly and thereby tend to retain the arm 34 in contacting engagement against the inner wall surface of the housing 12.

The rotatable arm 34 provides a guide finger 42 at its one end. The finger 42 extends outwardly through an arcuate slot 44 formed in the wall of housing 12. The finger 42 cooperates with the slot 44 to provide stop limits for predetermining the arcuate extent of rotation of the arm 34. A setting finger 46 is carried by the opposite end of the arm 34 and cooperates with a plurality of arcuately-arranged, spaced holes 48 in the wall of housing 12. In this way, manual rotation of the knob 38 will effect rotation of the arm 34 within a predetermined range of positions. The spring 40 will serve to urge the setting finger 46 against the inner wall surface of the housing 12 for extension through any of the holes 48 with which it may be brought into register.

By pressing the knob 38 against the bias of spring 40 toward the housing 12, the arm 34 and its setting finger 46 will be moved out of any of the holes 48 in which it may be positioned, and moved free of the inner wall surface of the housing 12, to permit rotation thereof to any selected position overlying the various holes 48. Upon release, the spring 40 will urge the setting finger 46 into an appropriate one of the holes 48 for determining a fixed position of adjustment of the arm 34. It will be understood that the guide finger 42 is of sufficiently greater length than the setting finger 46 to prevent its withdrawal from the slot 44 during rotation of the arm 34.

It will be apparent that the rotatable arm 34 provides an adjustably positioned stop means against which the free end of the lever arm 20 will engage when rotated in a clockwise direction to its lowered position for actuating a timing cycle. When the arm 34 is positioned in the lowermost of holes 48, maximum rotation of the arm 20 may be effected by the control knob 22, resulting in a relatively long timing cycle or period of unwinding of the clock timer 16, preferably about 16 seconds. Conversely, when the arm 34 is positioned in the uppermost of holes 48, the extent of rotation of the lever arm 20 will be more limited, resulting in a lesser extent of winding of the clock timer and a consequent shorter timing cycle, preferably about 8 seconds. Intermediate positions will serve to regulate operation at 10, 12, and 14 second periods.

Referring now more particularly to Figure 5 of the drawing, we have diagrammatically shown the electrical control circuit for the liquidizer embodying our invention. An electrical plug 50 is provided for connection to a suitable current supply. One lead 52 from the plug 50 provides conducting means to a switch 54 which is operatively connected to the mechanism of the timer 16. When in its unwound position, with the lever arm 20 disposed in its upper or rest position as seen in Figure 2, the contacts of switch 54 will be normally opened by the timer 16. As the clock works of the timer are wound by lowering rotation of the lever arm 20, the contacts of switch 54 will be closed by the timer 16 and will remain closed during full unwinding operation thereof. When the clock timer 16 has fully unwound and returned the lever arm 20 to its upper or rest position, the switch 54 will again be opened.

The field coil windings of the motor M are indicated at 56 and 58, and the armature of the motor M is indicated at 60. One of the windings 58 is in conducting relation with one of a pair of governor contacts 62, which are automatically closed and opened in response to the speed of rotation of the motor M. A resistor 64 is connected across the governor contacts 62 to prevent arcing during opening and closing thereof. A toggle switch 66 is provided for by-passing the governor contacts to permit the motor M to attain its full speed. An electrical lead 68 completes the circuit back to the plug 50.

As indicated more or less diagrammatically in Figure 6 of the drawing, a spaced control governor arrangement is provided substantially in the manner described in detail in Holstein Patents 2,623,961 and 2,623,962. The motor M provides a vertically oriented drive shaft having a lower end adapted to carry a governor mechanism. The motor shaft is indicated at 70 in Figure 6 (shown disposed horizontally merely for purposes of illustrative comparison with the Holstein patents). A resilient spider assembly 72 is carried by the shaft end and is peripherally weighted for axial extension and contraction of a contact actuator nib 74. The governor contacts 62 are mounted in normally spaced relation within the housing 12 by a suitable bracket 76. The contacts 62 are positioned closely adjacent the actuator nib 74 in the path of axial movement thereof. It will be apparent that the speed of rotation of the motor shaft 70 will serve to effect opening and closing of the contacts 62, and thereby control energization of the motor M to maintain a substantially constant predetermined speed.

During operation of the liquidizer for reconstituting frozen liquids, the toggle switch 66 is manually thrown to a contacts-open position suitably marked on the housing to indicate relatively low motor speed for "Frozen Juices" operation. In such position, the open contacts of switch 66 permit the opening and closing of the governor contacts 62 in response to governor operation to regulate the motor speed at a constant value of about 3,000 r.p.m. When using the liquidizer for such purposes as mixing malts, milk shakes and the like, the toggle switch 66 is manually thrown to a contacts-closed position designated by indicia indicating relatively higher motor speed for "Malts" operation. The governor is prevented from effecting controlled regulation, and the motor M is allowed to attain a relatively high speed of about 10,000 r.p.m. In this way, it is possible to employ the liquidizer for both conventional mixing operations and frozen liquid reconstituting, while utilizing the same high torque of the motor.

During practical operation the toggle switch 66 is thrown to its contacts-open or "Frozen Juices" position. Sufficient water is added to the bowl 14 to provide a predetermined volume, designated by a suitable line marking on the bowl 14, for providing a mixed drink of the desired size. The frozen fruit juice concentrate is then added to the water in the bowl 14. For example, an upper level line measuring 7½ oz. of water in the bowl 14 is provided. The addition of 2½ oz. of concentrate, suitably packaged in a polyethylene bag which is opened to permit squeezing of the contents by hand out of the package into the bowl 14, will then serve to provide the necessary composition for a 10 oz. drink. The bowl is also marked with a lower level line to measure 4½ oz. of water which is intended for use with a 1½ oz. package of concentrate to effect preparation of a 6 oz. drink.

In accordance with the temperature at which the frozen concentrate has been kept, and therefore its degree of softness and hardness, the timersetting knob 38 is rotated to a proper position of mixing operation within the range of 8 to 16 seconds. The control knob 22 is then lowered to actuate mixing operation and to effect automatic predetermined timing of the cycle of operation.

Changes may be made in the construction and arrangement of the parts of our control means for mixing device without departing from the real spirit and purpose of our invention, and it is our intention to cover by the claim any modified forms of structure or use of mechanical improvements which may be reasonably included within its scope.

What we claim as new and desire to obtain by Letters Patent of the United States is:

In an electrical appliance of the type having a motor, the improvement of control means for enabling the motor to be operated at full torque at either of two predetermined speeds for an adjustable timed cycle comprising a main electrical circuit for providing operating power to the motor, first switch means for interrupting said electrical circuit, said first switch means including a mechanical clock timer, a rotatable lever arm extending from said timer and adapted when rotated in one direction to effect winding thereof, a first pair of contacts in said circuit operatively associated with said timer so as to be closed when said timer is in its wound state and open to interrupt said circuit when said timer returns to its unwound state and adjustable setting means selectively operable to limit the rotation of said lever in said one direction to determine the period of the timed cycle of motor operation, second switch means for interrupting said electrical circuit, said second switch means including a second pair of contacts in said circuit and governor means operated by the motor for effecting opening and closing of said second pair of contacts in accordance with the speed of the motor for enabling the motor to be operated at full torque at a predetermined low speed and third switch means for interrupting said electrical circuit, said third switch means including a third pair of contacts connected in shunt with said second pair of contacts and manually operable actuating means for closing said third pair of contacts to enable said motor to be operated at full torque at a predetermined high speed independently of said governor means.

References Cited in the file of this patent

UNITED STATES PATENTS

| | | |
|---|---|---|
| 1,887,966 | Strite | Nov. 15, 1932 |
| 2,088,499 | Warner | July 27, 1937 |
| 2,092,955 | Chamberlain | Sept. 14, 1937 |
| 2,474,850 | Lee | July 5, 1949 |
| 2,588,221 | Edelman | Mar. 4, 1952 |
| 2,594,528 | White | Apr. 29, 1952 |
| 2,623,584 | Caffier et al. | Dec. 30, 1952 |
| 2,671,191 | Braski | Mar. 2, 1954 |